United States Patent [19]

Suzuki

[11] Patent Number: 5,517,360
[45] Date of Patent: May 14, 1996

[54] IMMERSION MICROSCOPE OBJECTIVE

[75] Inventor: Toshinobu Suzuki, Hachioji, Japan

[73] Assignee: Olympus Optical Co., Ltd., Tokyo, Japan

[21] Appl. No.: 276,460

[22] Filed: Jul. 18, 1994

[30] Foreign Application Priority Data

Jul. 19, 1993 [JP] Japan .................................. 5-177780

[51] Int. Cl.$^6$ .................................................. G02B 21/02
[52] U.S. Cl. ............................ 359/658; 357/656; 357/759
[58] Field of Search .................................. 359/656, 657, 359/658, 755, 757, 759

[56] References Cited

U.S. PATENT DOCUMENTS

| | | | |
|---|---|---|---|
| 2,644,943 | 7/1953 | Klein | 359/656 |
| 3,530,436 | 9/1970 | Bertele et al. | 359/657 |
| 4,232,940 | 11/1980 | Nakagama | 359/658 |
| 4,505,553 | 3/1985 | Asoma | 359/658 |
| 4,537,472 | 8/1985 | Asoma | 359/658 |
| 5,270,860 | 12/1993 | Suzuki | 359/656 |

FOREIGN PATENT DOCUMENTS

| | | | |
|---|---|---|---|
| 540011755A | 1/1979 | Japan | 359/658 |
| 590029216A | 2/1984 | Japan | 359/658 |
| 59-155822 | 9/1984 | Japan . | |
| 61-240218 | 10/1986 | Japan . | |
| 405196875A | 8/1993 | Japan | 359/656 |
| 406160720A | 6/1994 | Japan | 359/656 |
| 406160721A | 6/1994 | Japan | 359/656 |
| 406175035A | 6/1994 | Japan | 359/658 |

Primary Examiner—Georgia Y. Epps
Assistant Examiner—Michael A. Papalas
Attorney, Agent, or Firm—Cushman, Darby & Cushman

[57] ABSTRACT

An immersion microscope objective which has a magnification of about 60, an NA of 1.4, and a reduced number of constituent lens elements and yet which is satisfactorily corrected for spherical and axial chromatic aberrations and is also superior in the flatness of the image field. The objective has a 1-st lens unit (G1) having a positive refractive power as a whole and including a cemented lens having a cemented surface which is concave toward the object side, a 2-nd lens unit (G2) having a positive refractive power as a whole, a 3-rd lens unit (G3) including a cemented lens composed of a negative lens, a positive lens, and a negative lens, in order from the object side toward the image side, a 4-th lens unit (G4) of positive refractive power, a 5-th lens unit (G5) having a convex surface directed toward the object side at a position closest to the object side, and a concave surface directed toward the image side at a position closest to the image side, and a 6-th lens unit (G6) having a concave surface directed toward the object side at a position closest to the object side, and a convex surface directed toward the image side at a position closest to the image side.

6 Claims, 3 Drawing Sheets

Spherical aberration

Astigmatism

Distortion

Spherical aberration

Astigmatism

Distortion

IMMERSION MICROSCOPE OBJECTIVE

BACKGROUND OF THE INVENTION

The present invention relates to immersion microscope objectives. More particularly, the present invention relates to an apochromat-class immersion microscope objective having a magnification of about 60 and a numerical aperture (NA) of 1.4.

Conventional objectives which are similar to the immersion microscope objective of the present invention, which will be described later, include those disclosed in Japanese Patent Application Laid-Open (KOKAI) Nos. 59-155822 and 61-240218. Japanese Patent Application Laid-Open (KOKAI) No. 59-155822 discloses an apochromatic objective having a favorably flattened image field, which includes, in order from the object side, a 1-st lens unit having a buried lens, a 2-nd lens unit having a meniscus positive lens, a 3-rd lens unit having a cemented lens composed of three lens elements, that is, positive, negative and positive lenses, a 4-th lens unit having a cemented lens composed of three lens elements, that is, negative, positive and negative lenses, a 5-th lens unit including a cemented meniscus lens having a strong concave surface directed toward the image side, and a 6th lens unit including a cemented meniscus lens having a strong concave surface directed toward the object side. Japanese Patent Application Laid-Open (KOKAI) No. 61-240218 discloses an apochromatic objective having a favorably flattened image field, which includes, in order from the object side, a 1-st lens unit having a buried lens, a 2-nd lens unit having a meniscus positive lens, 3-rd and 4-th lens units each including a cemented lens composed of two lens elements, that is, negative and positive lenses, a 5-th lens unit having a cemented lens composed of three lens elements, that is, negative, positive and negative lenses, a 6th lens unit including a cemented meniscus lens having a strong concave surface directed toward the image side, a 7-th lens unit including a cemented meniscus lens having a strong concave surface directed toward the object side, and an 8-th lens unit including a meniscus positive lens having a concave surface directed toward the object side. The above-described two conventional objectives have something in common with each other in their arrangements: the 1-st lens unit has a buried lens; a cemented lens composed of three lens elements, that is, negative, positive and negative lenses, is used; and a Gauss type lens, which has concave surfaces facing each other, is disposed in the rear part of the objective.

However, the objective disclosed in Japanese Patent Application Laid-Open (KOKAI) No. 59-155822 is not satisfactorily corrected for spherical and axial chromatic aberrations. On the other hand, the objective disclosed in Japanese Patent Application Laid-Open (KOKAI) No. 61-240218 is satisfactorily corrected for axial aberrations but requires a large number of constituent lens elements, i.e., 15 lens elements arranged in 8 lens units.

SUMMARY OF THE INVENTION

In view of the above-described problems of the prior art, it is an object of the present invention to provide an immersion microscope objective which has a magnification of about 60, an NA of 1.4, and a smaller number of constituent lens elements than in the case of Japanese Patent Application Laid-Open (KOKAI) No. 61-240218, and yet which is satisfactorily corrected for spherical and axial chromatic aberrations and is also superior in the flatness of the image field.

To attain the above-described object, the present invention provides an immersion microscope objective including, in order from the object side, a 1-st lens unit having a positive refractive power as a whole and including a cemented lens having a cemented surface which is concave toward the object side, a 2-nd lens unit having a positive refractive power as a whole, a 3-rd lens unit including a cemented lens composed of a negative lens, a positive lens, and a negative lens, in order from the object side toward the image side, a 4-th lens unit of positive refractive power, a 5-th lens unit having a convex surface directed toward the object side at a position closest to the object side, and a concave surface directed toward the image side at a position closest to the image side, and a 6-th lens unit having a concave surface directed toward the object side at a position closest to the object side, and a convex surface directed toward the image side at a position closest to the image side.

In addition, the present invention provides an immersion microscope objective including, in order from the object side, a 1-st lens unit having a positive refractive power as a whole and including a cemented lens having a cemented surface which is concave toward the object side, a 2-nd lens unit including at least one positive lens and at least one negative lens and having a positive refractive power as a whole, a 3-rd lens unit including a cemented lens composed of a negative lens, a positive lens, and a negative lens, in order from the object side toward the image side, a 4-th lens unit of positive refractive power, a 5-th lens unit having a convex surface directed toward the object side at a position closest to the object side, and a concave surface directed toward the image side at a position closest to the image side, and a 6-th lens unit having a concave surface directed toward the object side at a position closest to the object side, and a convex surface directed toward the image side at a position closest to the image side.

In addition, the present invention provides an immersion microscope objective including, in order from the object side, a 1-st lens unit of positive refractive power which has a cemented lens composed of a plano-convex lens and a meniscus lens having a concave surface stronger in power than other surfaces which is directed toward the object side, a 2-nd lens unit having a positive refractive power as a whole and including at least one positive lens and at least one negative lens, a 3-rd lens unit including a cemented lens composed of three lens elements, that is, a negative lens, a positive lens, and a negative lens, a 4-th lens unit of positive refractive power, a 5-th lens unit including a cemented meniscus lens having a concave surface stronger in power than other surfaces which is directed toward the image side, and a 6-th lens unit including a cemented meniscus lens having a concave surface stronger in power than other surfaces which is directed toward the object side. The immersion microscope objective satisfies the following condition (1):

$$H_3 < H_4 \tag{1}$$

where $H_3$ is a height at which a light ray of maximum numerical aperture passes the object-side cemented surface in the cemented lens in the 3-rd lens unit, which is composed of three lens elements, that is, a negative lens, a positive lens, and a negative lens, and $H_4$ is a height at which a light ray of maximum numerical aperture passes the surface in the 4-th lens unit that is closest to the object side.

In the above-described arrangements, it is preferable to satisfy the following condition (2):

$$0.05 < f/f_4 < 0.2 \quad (2)$$

where $f_4$ is the focal length of the 4-th lens unit, and f is the focal length of the entire objective lens system.

Further, the 2-nd lens unit preferably includes a cemented lens composed of three lens elements, that is, a positive lens, a negative lens, and a positive lens, in order from the object side. In this case, it is preferable to satisfy the following condition (3):

$$n_5 - n_4 > 0.03 \quad (3)$$

where $n_4$ is the refractive index for the spectral d-line of the positive lens in the 2-nd lens unit that is closest to the object side, and $n_5$ is the refractive index for the spectral d-line of the negative lens in the 2-nd lens unit.

The reason for adopting the above-described arrangements and the functions thereof will be explained below.

First, in order to obtain a plan objective in the present invention, a cemented lens is used as the front lens in the 1-st lens unit, and the radius of curvature of the cemented surface of the cemented lens is made extremely small so that the cemented surface has a negative power, although this is a well-known technique. Further, a lens unit of the Gauss type is disposed in the rear part of the objective, that is, the 5-th and 6-th lens units in the present invention, so that the curvature of field is corrected by the action of the concave surfaces of the Gauss type lens unit, although this is also a well-known technique. Next, in order to effectively correct spherical and axial chromatic aberrations, a lens unit which includes at least one positive lens and at least one negative lens and which has a positive refractive power as a whole is disposed as a 2-nd lens unit, and a three-element cemented lens composed of negative, positive and negative lenses is disposed in the 3-rd lens unit. So far, the arrangement is the same as that of the conventional objective disclosed in Japanese Patent Application Laid-Open (KOKAI) No. 59-155822. In the present invention, however, a 4-th lens unit of positive refractive power is disposed between the 3-rd and 5-th lens units in order to correct spherical and axial chromatic aberrations. With this arrangement, the negative power of the object-side cemented surface of the three-element cemented lens, which is composed of negative, positive and negative lenses, in the 3-rd lens unit can be effectively used for correction of axial aberrations. The negative power of the cemented surface is indispensable for satisfactorily correcting axial aberrations with an NA of 1.4. In the prior art disclosed in Japanese Patent Application Laid-Open (KOKAI) No. 59-155822, the negative power of the cemented surface is used for aberration correction, but it is insufficient for satisfactorily correcting axial aberrations. In the present invention, it is necessary to satisfy the following condition (1):

$$H_3 < H_4 \quad (1)$$

where $H_3$ is a height at which a light ray of maximum numerical aperture passes the object-side cemented surface in the 3-rd lens unit, and $H_4$ is a height at which a light ray of maximum numerical aperture passes the surface in the 4-th lens unit that is closest to the object side.

If the condition (1) is not satisfied, the negative power of the object-side cemented surface in the 3-rd lens unit is insufficient for satisfactorily correcting axial aberrations.

Various aberrations can be corrected even more effectively by further satisfying the following condition (2)

$$0.05 < f/f_4 < 0.2 \quad (2)$$

where $f_4$ is the focal length of the 4-th lens unit, and f is the focal length of the entire objective lens system.

The condition (2) defines the power of the 4-th lens unit. The condition (2) must be satisfied for effective correction of axial aberrations, particularly coma. The present invention differs from Japanese Patent Application Laid-Open (KOKAI) No. 59-155822 in that the former includes a 4-th lens unit of positive refractive power. By virtue of the presence of the 4-th lens unit, the negative power of the object-side cemented surface of the three-element cemented lens in the 3-rd lens unit can be made useful for correction of axial aberrations, as described above. The 4th lens unit is also useful for correction of off-axis aberrations. That is, in Japanese Patent Application Laid-Open (KOKAI) No. 59-155822, a cemented meniscus lens having a strong concave surface directed toward the image side is disposed as a front lens unit in a Gauss type lens. In the present invention, the 4-th lens unit is added to the object side of the above-described lens, thereby making it possible to disperse the positive power of the surface in the Gauss type lens unit that is closest to the object side. If $f/f_4$ is not smaller than the upper limit of the condition (2), i.e., 0.2, the positive power of the 4-th lens unit becomes excessively strong, and the positive power of the surface in the 5-th lens unit that is closest to the object side becomes undesirably weak. Consequently, it becomes impossible to correct comatic aberration. If $f/f_4$ is not larger than the lower limit of the condition (2), i.e., 0.05, the power of the 4-th lens unit becomes weak, and the positive power of the surface in the 5-th lens unit that is closest to the object side becomes undesirably strong. As a result, it also becomes impossible to correct coma.

When the 2-nd lens unit includes a three-element cemented lens composed of a positive lens, a negative lens, and a positive lens, it is preferable to satisfy the following condition (3):

$$n_5 - n_4 > 0.03 \quad (3)$$

where $n_4$ and $n_5$ are the refractive indices for the spectral d-line of the object-side positive lens and the negative lens in the 2-nd lens unit.

By satisfying the condition (3), undesired bending of the spherical and axial chromatic aberration curves can be effectively corrected. In the prior art disclosed in Japanese Patent Application Laid-Open (KOKAI) No. 59-155822, the two object-side lenses in the three-element cemented lens, which is composed of positive, negative and positive lenses, are arranged to be hyperchromatic so as to eliminate undesired bending of the chromatic spherical aberration curve. It is, however, preferable to make good use of the negative power of the cemented surface by giving a refractive index difference to the cemented surface. If $n_5 - n_4$ is not larger than the lower limit of the condition (3), i.e., 0.03, the negative power of the cemented surface becomes weak, so that it is difficult to effectively correct bending of the spherical and axial chromatic aberration curves.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 and 2 of the immersion microscope objective according to the present invention will be described below.

Figure 1:
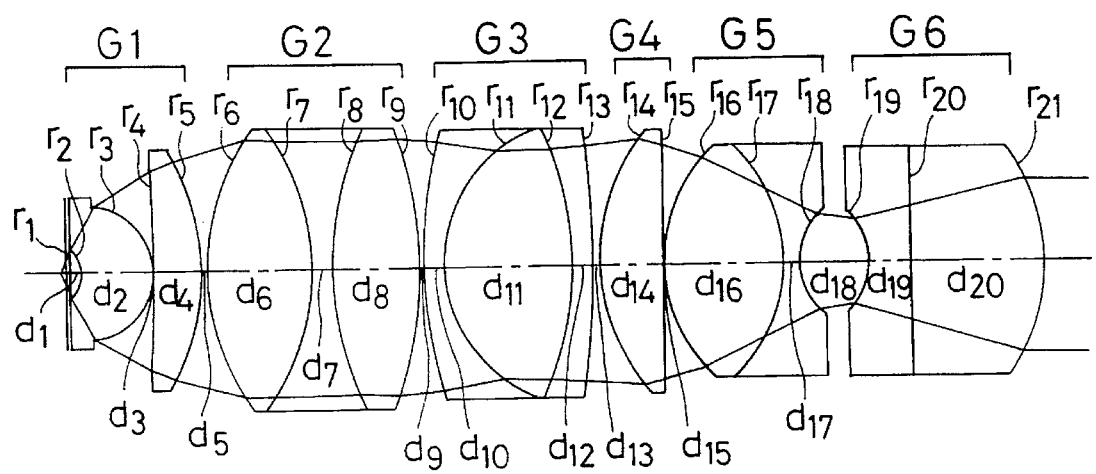
FIG. 1 is a sectional view of Example 1 of the immersion microscope objective according to the present invention.

Lens data in each Example will be described later. FIG. 1 is a sectional view showing the lens arrangement in Example 1. Since the arrangement of Example 2 is substantially the same as that of Example 1, illustration thereof is omitted.

Regarding the arrangement of each lens unit, in both Example 1 and 2, the 1-st lens unit G1 has three lens elements, that is, a cemented lens composed of a plano-convex lens and a meniscus lens having a concave surface directed toward the object side, and a positive meniscus lens having a concave surface directed toward the object side. The 2-nd lens unit G2 has a cemented lens composed of three lens elements, that is, a biconvex lens, a biconcave lens, and a biconvex lens. The 3-rd lens unit G3 has a cemented lens composed of three lens elements, that is, a negative meniscus lens having a convex surface directed toward the object side, a biconvex lens, and a negative meniscus lens having a convex surface directed toward the image side. The 4-th lens unit G4 is comprised of a single positive meniscus lens having a convex surface directed toward the object side. The 5-th lens unit G5 has a cemented lens composed of two lens elements, that is, a biconvex lens and a biconcave lens. The 6-th lens unit G6 in Example 1 has a cemented lens composed of two lens elements, that is, a biconcave lens and a biconvex lens. In Example 2, the 6-th lens unit G6 has a cemented lens composed of two lens elements, that is, a plano-concave lens and a plano-convex lens.

Lens data in each Example will be shown below. In the following: $r_1, r_2 \ldots$ are the curvature radii of lens surfaces, which are shown in order from the object side; $d_1, d_2 \ldots$ are the spacings between adjacent lens surfaces, shown in order from the object side; $n_{d1}, n_{d2} \ldots$ are the refractive indices of the lenses for the spectral d-line, shown in order from the object side; and $v_{d1}, v_{d2} \ldots$ are the Abbe's numbers of the lenses, shown in order from the object side. Further, $h_1, h_2 \ldots$ are the heights at which a light ray of maximum numerical aperture passes the lens surfaces, respectively.

In both Example 1 and 2, the focal length f is 3, the magnification is 60, and the numerical aperture NA is 1.4. The working distance is 0.14. It should be noted that each Example employs an oil immersion system designed so that the refractive index and Abbe's number of an oil used are $n_d$=1.51548 and $v_d$=43.10, respectively. Further, the design refractive index, Abbe's number and thickness of the cover glass are $n_d$=1.521, $v_d$=56.02, and d=0.17 mm, respectively.

| | | | | |
|---|---|---|---|---|
| $r_1 = \infty$ | $d_1 = 0.6000$ | $n_{d1} = 1.51633$ | $v_{d1} = 64.15$ | $h_1 = 0.738$ |
| $r_2 = -1.8192$ | $d_2 = 3.8400$ | $n_{d2} = 1.88300$ | $v_{d2} = 40.78$ | $h_2 = 1.165$ |
| $r_3 = -3.2177$ | $d_3 = 0.1000$ | | | $h_3 = 3.217$ |
| $r_4 = -20.4857$ | $d_4 = 2.1418$ | $n_{d3} = 1.56907$ | $v_{d3} = 71.30$ | $h_4 = 4.744$ |
| $r_5 = -8.7588$ | $d_5 = 0.3000$ | | | $h_5 = 5.181$ |
| $r_6 = 11.0685$ | $d_6 = 5.3000$ | $n_{d4} = 1.49700$ | $v_{d4} = 81.61$ | $h_6 = 6.329$ |
| $r_7 = -10.4406$ | $d_7 = 1.0000$ | $n_{d5} = 1.61340$ | $v_{d5} = 43.84$ | $h_7 = 6.251$ |
| $r_8 = 18.9938$ | $d_8 = 4.5000$ | $n_{d6} = 1.43875$ | $v_{d6} = 94.97$ | $h_8 = 6.237$ |
| $r_9 = -17.4921$ | $d_9 = 0.1500$ | | | $h_9 = 6.324$ |
| $r_{10} = 25.5110$ | $d_{10} = 1.0000$ | $n_{d7} = 1.67650$ | $v_{d7} = 37.54$ | $h_{10} = 6.081$ |
| $r_{11} = 6.4981$ | $d_{11} = 6.5000$ | $n_{d8} = 1.43875$ | $v_{d8} = 94.97$ | $h_{11} = 5.519$ |
| $r_{12} = -16.9602$ | $d_{12} = 1.0000$ | $n_{d9} = 1.74000$ | $v_{d9} = 31.71$ | $h_{12} = 5.638$ |
| $r_{13} = -37.6734$ | $d_{13} = 0.3000$ | | | $h_{13} = 5.789$ |
| $r_{14} = 8.7662$ | $d_{14} = 3.1000$ | $n_{d10} = 1.45600$ | $v_{d10} = 90.31$ | $h_{14} = 5.971$ |
| $r_{15} = 145.8837$ | $d_{15} = 0.1500$ | | | $h_{15} = 5.769$ |
| $r_{16} = 7.8660$ | $d_{16} = 5.7340$ | $n_{d11} = 1.61800$ | $v_{d11} = 63.38$ | $h_{16} = 5.130$ |
| $r_{17} = -8.8483$ | $d_{17} = 1.0000$ | $n_{d12} = 1.67650$ | $v_{d12} = 37.54$ | $h_{17} = 3.554$ |
| $r_{18} = 3.0648$ | $d_{18} = 3.2000$ | | | $h_{18} = 2.284$ |
| $r_{19} = -3.4631$ | $d_{19} = 2.0409$ | $n_{d13} = 1.74000$ | $v_{d13} = 31.71$ | $h_{19} = 2.127$ |
| $r_{20} = 270.3729$ | $d_{20} = 6.7011$ | $n_{d14} = 1.80518$ | $v_{d14} = 25.43$ | $h_{20} = 2.839$ |
| $r_{21} = -8.4836$ | | | | $h_{21} = 4.206$ |

$H_3 = 5.519$, $H_4 = 5.97$  Therefore (1) $H_3 < H_4$.
$f = 3$, $f_4 = 20.309$  Therefore (2) $f/f_4 = 0.148$.
  That is, $0.05 < f/f_4 < 0.2$.
$n_5 = 1.6134$, $n_4 = 1.497$  Therefore (3) $n_5 - n_4 = 0.1164 > 0.03$.

| | | | | |
|---|---|---|---|---|
| $r_1 = \infty$ | $d_1 = 0.6000$ | $n_{d1} = 1.51633$ | $v_{d1} = 64.15$ | $h_1 = 0.738$ |
| $r_2 = -1.6667$ | $d_2 = 3.8400$ | $n_{d2} = 1.88300$ | $v_{d2} = 40.78$ | $h_2 = 1.127$ |
| $r_3 = -3.2023$ | $d_3 = 0.1000$ | | | $h_3 = 3.202$ |
| $r_4 = -52.2796$ | $d_4 = 2.1703$ | $n_{d3} = 1.56907$ | $v_{d3} = 71.30$ | $h_4 = 4.936$ |
| $r_5 = -10.3690$ | $d_5 = 0.3000$ | | | $h_5 = 5.292$ |

-continued

| | | | | |
|---|---|---|---|---|
| $r_6 = 11.2374$ | $d_6 = 5.3000$ | $n_{d4} = 1.49700$ | $v_{d4} = 81.61$ | $h_6 = 6.242$ |
| $r_7 = -11.1093$ | $d_7 = 1.0000$ | $n_{d5} = 1.61340$ | $v_{d5} = 43.84$ | $h_7 = 9.139$ |
| $r_8 = 14.1710$ | $d_8 = 4.4000$ | $n_{d6} = 1.43875$ | $v_{d6} = 94.97$ | $h_8 = 6.087$ |
| $r_9 = -17.7800$ | $d_9 = 0.1500$ | | | $h_9 = 6.172$ |
| $r_{10} = 23.3833$ | $d_{10} = 1.0000$ | $n_{d7} = 1.67650$ | $v_{d7} = 37.54$ | $h_{10} = 5.969$ |
| $r_{11} = 6.6345$ | $d_{11} = 6.5000$ | $n_{d8} = 1.43875$ | $v_{d8} = 94.97$ | $h_{11} = 5.457$ |
| $r_{12} = -14.2468$ | $d_{12} = 1.1000$ | $n_{d9} = 1.74000$ | $v_{d9} = 31.71$ | $h_{12} = 5.524$ |
| $r_{13} = -39.1279$ | $d_{13} = 0.3000$ | | | $h_{13} = 5.692$ |
| $r_{14} = 9.6642$ | $d_{14} = 3.1000$ | $n_{d10} = 1.43875$ | $v_{d10} = 94.97$ | $h_{14} = 5.837$ |
| $r_{15} = 676.3617$ | $d_{15} = 0.1500$ | | | $h_{15} = 5.623$ |
| $r_{16} = 7.3814$ | $d_{16} = 5.7117$ | $n_{d11} = 1.61800$ | $v_{d11} = 63.38$ | $h_{16} = 5.055$ |
| $r_{17} = -7.8434$ | $d_{17} = 1.0000$ | $n_{d12} = 1.64450$ | $v_{d12} = 40.82$ | $h_{17} = 3.682$ |
| $r_{18} = 3.0966$ | $d_{18} = 3.2000$ | | | $h_{18} = 2.310$ |
| $r_{19} = -3.3876$ | $d_{19} = 2.0626$ | $n_{d13} = 1.74000$ | $v_{d13} = 31.71$ | $h_{19} = 2.119$ |
| $r_{20} = \infty$ | $d_{20} = 6.7611$ | $n_{d14} = 1.80518$ | $v_{d14} = 25.43$ | $h_{20} = 2.826$ |
| $r_{21} = -8.5494$ | | | | $h_{21} = 4.198$ |

$H_3 = 5.457, H_4 = 5.837$   Therefore (1) $H_3 < H_4$
$f = 3, f_4 = 22.314$   Therefore (2) $f/f_4 = 0.134$
That is, $0.05 < f/f_4 < 0.2$
$n_5 = 1.6134, n_4 = 1.497$   Therefore (3) $n_5 - n_4 = 0.1164 > 0.03$.

The objective in each of the above-described Examples is used in combination with an imaging lens which has lens data shown below, for example, and which is illustrated in the sectional view of FIG. 2. In the following lens data: $r_1'$, $r_2'$ . . . are the curvature radii of lens surfaces, which are shown in order from the object side; $d_1'$, $d_2'$ . . . are the spacings between adjacent lens surface, shown in order from the object side; $n_{d1}'$, $n_{d2}'$ . . . are the refractive indices of the lenses for the spectral d-line, shown in order from the object side; and $v_{d1}'$, $v_{d2}'$ . . . are the Abbe's numbers of lenses, shown in order from the object side.

| | | | |
|---|---|---|---|
| $r_1' = 68.7541$ | $d_1' = 7.7321$ | $n_{d1}' = 1.48749$ | $v_{d1}' = 70.20$ |
| $r_2' = -37.5679$ | $d_2' = 3.4742$ | $n_{d2}' = 1.80610$ | $v_{d2}' = 40.95$ |
| $r_3' = -102.8477$ | $d_3' = 0.6973$ | | |
| $r_4' = 84.3099$ | $d_4' = 6.0238$ | $n_{d3}' = 1.83400$ | $v_{d3}' = 37.16$ |
| $r_5' = -50.7100$ | $d_5' = 3.0298$ | $n_{d4}' = 1.64450$ | $v_{d4}' = 40.82$ |
| $r_6' = 40.6619$ | | | |

Figure 2:
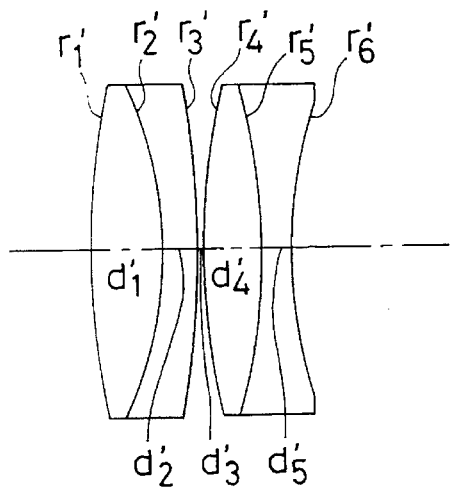
FIG. 2 is a sectional view of an imaging lens used in combination with the objective of each Example of the present invention.
Figure 3A:
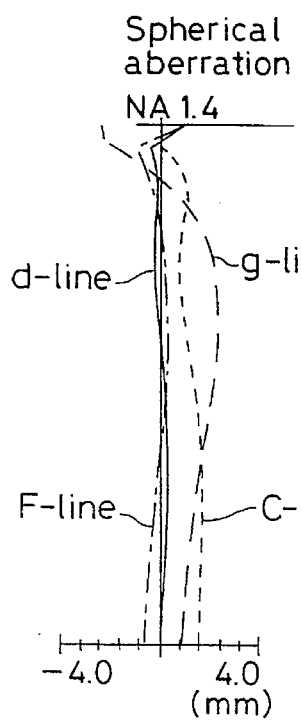
FIGS. 3A–3C graphically show spherical aberration, astigmatism and distortion in Example 1.
Figure 3B:
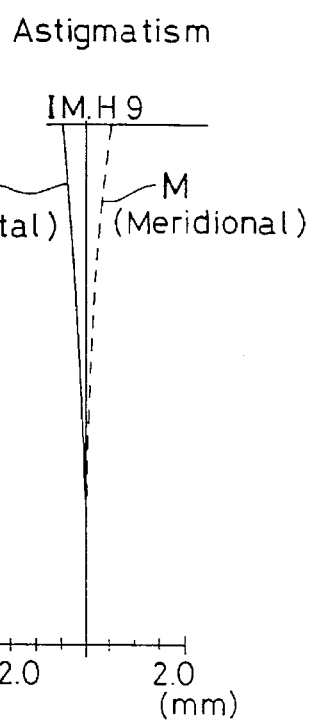
Figure 3C:
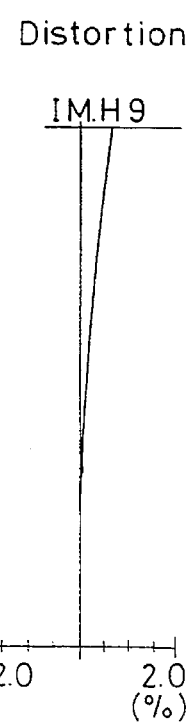
Figure 4A:
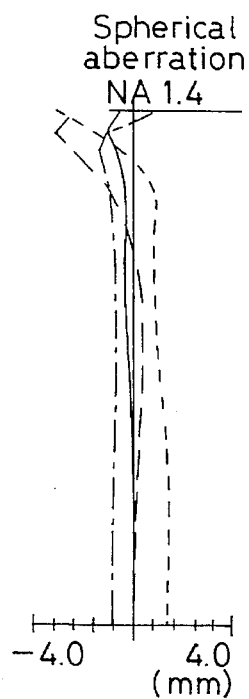
FIGS. 4A–4C graphically shows spherical aberration, astigmatism and distortion in Example 2.
Figure 4B:
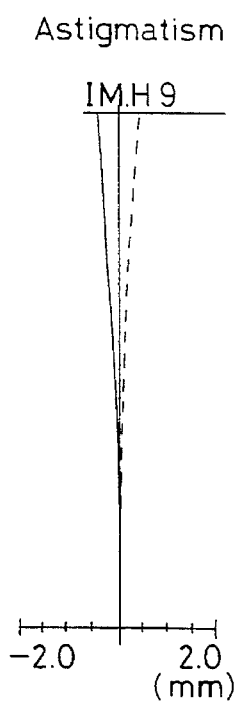
Figure 4C:
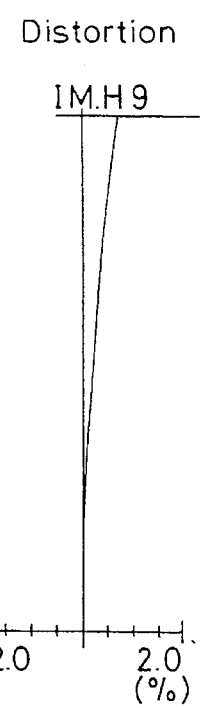

In this case, the spacing between the objective in Examples 1 and 2 and the imaging lens, shown in FIG. 2, may be set in the range of from 50 mm to 170 mm. FIGS. 3A–3C and 4A–4C graphically show spherical aberration, astigmatism and distortion in Example 1 and 2, respectively, in a case where the spacing between the objective and the imaging lens is set at 56 mm. It should be noted that even when the above spacing is not 56 mm, if it is in the range of 50 mm to 170 mm, substantially the same aberration conditions are presented.

Figure 5A:
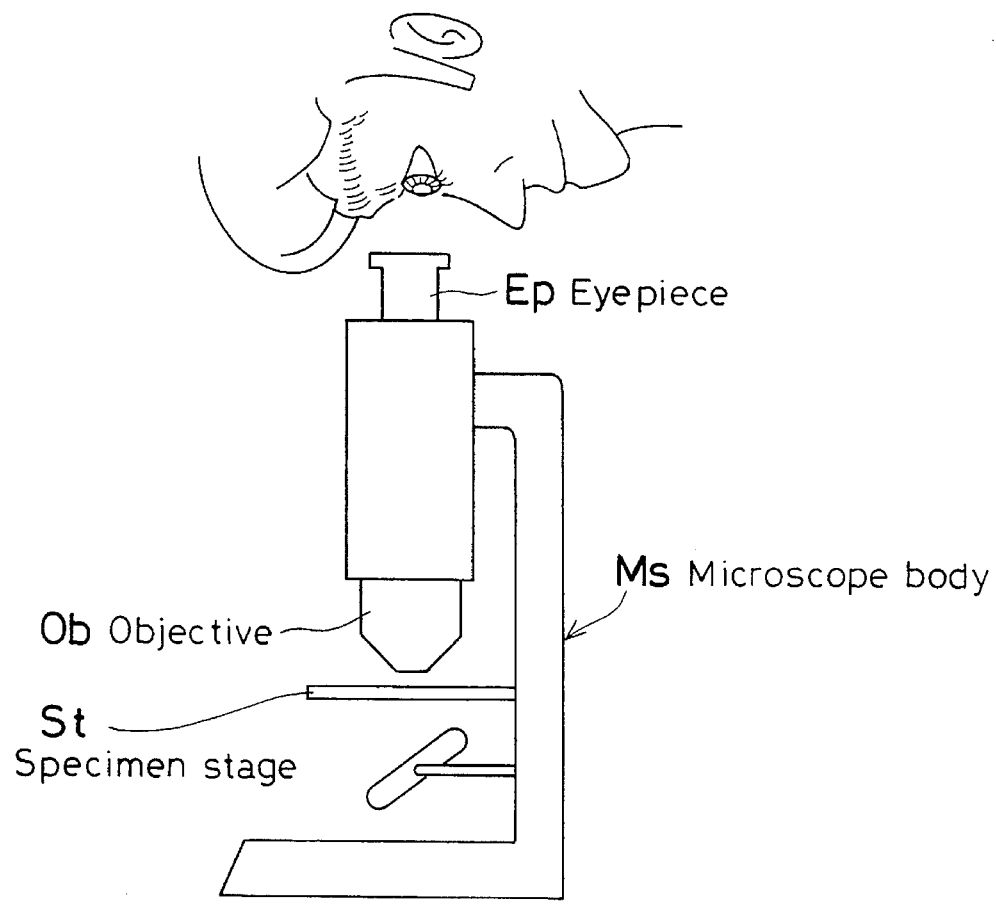
FIG. 5(a) schematically shows the arrangement of a microscope that uses the objective of the present invention.
Figure 5B:
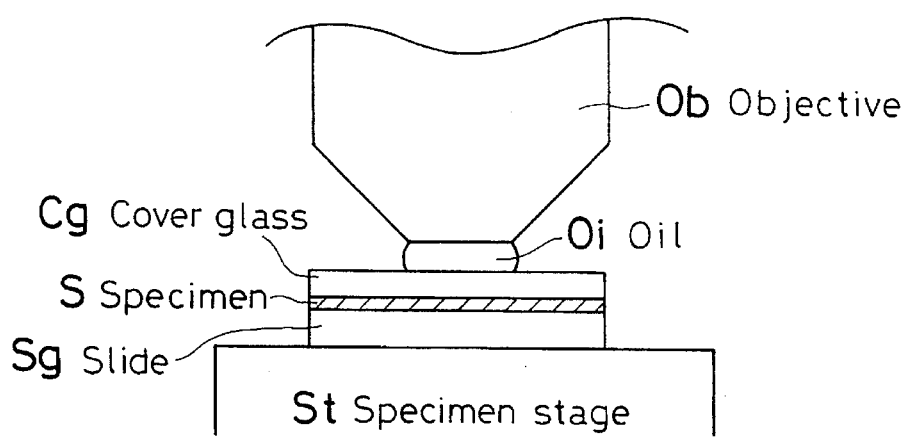
FIG. 5(b) is an enlarged view of the distal end portion of the objective in the arrangement shown in FIG. 5(a).

The following is a brief description of the arrangement and operation of a microscope that uses the immersion microscope objective of the present invention. FIG. 5(a) schematically shows the arrangement of the immersion microscope. FIG. 5(b) is an enlarged view of the distal end portion of the objective. The microscope body Ms includes an objective Ob, an eyepiece Ep, a specimen stage St, etc. A specimen S which is sandwiched between a slide Sg and a cover glass Cg is placed on the specimen stage St, and oil Oi is dropped onto the cover glass Cg. In this state, the objective Ob is brought close to the cover glass Cg. As a result, the gap between the objective Ob and the cover glass Cg is filled with the oil Oi. Thus, since the gap between the objective Ob and the specimen S is filled with the oil Oi, a ray bundle of relatively large NA from the specimen S can also enter the objective Ob to contribute to image formation, and it is therefore possible to make observation with a higher magnification and to effect image formation even more favorably from the viewpoint of aberrations in comparison to a dry system in which the objective Ob faces the specimen S across an air layer.

As has been described above, the present invention provides an immersion microscope objective which has a magnification of about 60, a numerical aperture NA of 1.4 and a smaller number of constituent lens elements than in the case of Japanese Patent Application Laid-Open (KOKAI) No. 61-240218, and yet which is satisfactorily corrected for spherical and axial chromatic aberrations and has a flattened image field over a wide field of view.

What we claim is:

1. An immersion microscope objective comprising, in order from an object side thereof:

a first lens unit having a positive refractive power as a whole and including a cemented lens having a cemented surface which is concave toward the object side;

a second lens unit having a positive refractive power as a whole;

a third lens unit including a cemented lens including a negative lens, a positive lens, and a negative lens, in order from the object side toward an image side of said objective;

a fourth lens unit of positive refractive power;

a fifth lens unit having a convex surface directed toward the object side at a position closest to the object side, and a concave surface directed toward the image side at a position closest to the image side; and a sixth lens unit having a concave surface directed toward the object side at a position closest to the object side, and a convex surface directed toward the image side at a position closest to the image side.

2. An immersion microscope objective comprising, in order from an object side thereof:

a first lens unit having a positive refractive power as a whole and including a cemented lens having a cemented surface which is concave toward the object side;

a second lens unit including at least one positive lens and at least one negative lens and having a positive refractive power as a whole;

a third lens unit including a cemented lens composed of a negative lens, a positive lens, and a negative lens, in order from the object side toward an image side;

a fourth lens unit of positive refractive power;

a fifth lens unit having a convex surface directed toward the object side at a position closest to the object side, and a concave surface directed toward the image side at a position closest to the image side; and a sixth lens unit having a concave surface directed toward the object side at a position closest to the object side, and a convex surface directed toward the image side at a position closest to the image side.

3. An immersion microscope objective comprising, in order from an object side thereof:

a first lens unit of positive refractive power which has a cemented lens including a plane-convex lens and a meniscus lens having a concave surface stronger in power than another surface which is directed toward the object side;

a second lens unit having a positive refractive power as a whole and including at least one positive lens and at least one negative lens;

a third lens unit including a cemented lens comprising a negative lens, a positive lens, and a negative lens;

a fourth lens unit of positive refractive power;

a fifth lens unit including a cemented meniscus lens having a concave surface which is directed toward an image side; and a sixth lens unit including a cemented meniscus lens having a concave surface stronger in power than another surface directed toward the object side;

said immersion microscope objective satisfying the following condition (1):

$$H_3 < H_4 \quad (1)$$

where $H_3$ is a height at which a light ray of maximum numerical aperture passes the object-side cemented surface in the cemented lens in the third lens unit and $H_4$ is a height at which a light ray of maximum numerical aperture passes the surface in the fourth lens unit that is closest to the object side.

4. An immersion microscope objective according to claims 1, 2 or 3, which satisfies the following condition (2):

$$0.05 < f/f_4 < 0.2 \quad (2)$$

where $f_4$ is the focal length of the fourth lens unit, and $f$ is the focal length of the entire objective lens system.

5. An immersion microscope objective according to claim 1, 2 or 3, wherein said second lens unit includes a cemented lens comprising a positive lens, a negative lens, and a positive lens, in order from the object side.

6. An immersion microscope objective according to Claim 5, which satisfies the following condition (3):

$$n_5 - n_4 > 0.03 \quad (3)$$

where $n_4$ is the refractive index for the spectral d-line of the positive lens in the second lens unit that is closest to the object side, and $n_5$ is the refractive index for the spectral d-line of the negative lens in the second lens unit.

* * * * *